US011649928B2

(12) United States Patent
Mann et al.

(10) Patent No.: US 11,649,928 B2
(45) Date of Patent: May 16, 2023

(54) LIQUID METHANE STORAGE AND FUEL DELIVERY SYSTEM

(71) Applicant: BENNAMANN SERVICES LTD, Newquay (GB)

(72) Inventors: Christopher Mark Mann, St. Mawgan (GB); Kate Joanne Dibble, Wadebridge (GB); Thomas William Bradshaw, Nr Wantage (GB); Andrew John Taylor Whitehouse, Sale (GB); Duncan Stuart Glasby, Wadebridge (GB); Jack Brom Sebastian Irwin, Southampton (GB); Jamie Eric Freemann, Plymouth (GB); George Edward Hyde-Linaker, St Austell (GB)

(73) Assignee: BENNAMANN SERVICES LTD, Wadebridge (GB)

( * ) Notice: Subject to any disclaimer, the term of this patent is extended or adjusted under 35 U.S.C. 154(b) by 0 days.

(21) Appl. No.: 16/765,980

(22) PCT Filed: Nov. 20, 2018

(86) PCT No.: PCT/IB2018/059148
§ 371 (c)(1),
(2) Date: May 21, 2020

(87) PCT Pub. No.: WO2019/102357
PCT Pub. Date: May 31, 2019

(65) Prior Publication Data
US 2020/0355325 A1    Nov. 12, 2020

(30) Foreign Application Priority Data
Nov. 22, 2017    (GB) ...................................... 1719399

(51) Int. Cl.
*F17C 3/08*    (2006.01)
*B65D 90/12*    (2006.01)

(52) U.S. Cl.
CPC ................ *F17C 3/08* (2013.01); *B65D 90/12* (2013.01); *F17C 2201/0109* (2013.01);
(Continued)

(58) Field of Classification Search
CPC ................ F17C 2270/0168; F17C 3/08; F17C 2201/0109; F17C 2203/0391;
(Continued)

(56) References Cited

U.S. PATENT DOCUMENTS 883,479 A * 3/1908 Hood
3,115,983 A   12/1963 Wissmiller
(Continued)

FOREIGN PATENT DOCUMENTS

CN    101114012 A    1/2008
DE    102009002578 A1    10/2010
(Continued)

OTHER PUBLICATIONS

The International Search Report and the Written Opinion issued for International application No. PCT/IB82018/059148, dated May 16, 2019, 19 pages.
(Continued)

*Primary Examiner* — Stephen J Castellano
(74) *Attorney, Agent, or Firm* — Rothwell, Figg, Ernst & Manbeck, PC

(57) ABSTRACT

Systems and methods for the storage and delivery of fuel, such as methane. In certain aspects, a system is provided with an inner vessel, and outer vessel, and a rope suspension system connecting the two vessels. In certain aspects, the
(Continued)

disclosed storage tanks operate at low pressure with long hold times, and have a non-cylindrical shape.

26 Claims, 17 Drawing Sheets

(52) U.S. Cl.
CPC .............. *F17C 2203/0391* (2013.01); *F17C 2221/033* (2013.01); *F17C 2223/0161* (2013.01); *F17C 2270/0168* (2013.01)

(58) Field of Classification Search
CPC ... F17C 2221/033; B65D 90/12; B65D 90/04; B65D 90/046
See application file for complete search history.

(56) References Cited

U.S. PATENT DOCUMENTS

| | | | | |
|---|---|---|---|---|
| 3,932,697 | A | * | 1/1976 | Hood .................. D07B 1/185 174/79 |
| 5,315,831 | A | | 5/1994 | Goode et al. |
| 5,522,428 | A | * | 6/1996 | Duvall ............. B60K 15/03006 137/624.11 |
| 6,041,762 | A | * | 3/2000 | Sirosh ................ F02M 21/0242 123/529 |
| 9,746,132 | B2 | | 8/2017 | Gustafson et al. |
| 2003/0047561 | A1 | * | 3/2003 | Neto .................... B65D 90/046 220/1.6 |
| 2011/0127174 | A1 | * | 6/2011 | Heinrich ............... C01B 3/0005 206/0.7 |
| 2012/0259560 | A1 | * | 10/2012 | Woltring ............. G01F 23/2962 702/55 |
| 2013/0061608 | A1 | | 3/2013 | Lurken et al. |
| 2016/0053941 | A1 | | 2/2016 | Matthias |
| 2016/0108857 | A1 | | 4/2016 | Kanafani |
| 2017/0191621 | A1 | | 7/2017 | Caristan et al. |
| 2017/0268726 | A1 | | 9/2017 | Zou |

FOREIGN PATENT DOCUMENTS

| | | |
|---|---|---|
| DE | 202013101593 U1 | 4/2013 |
| EP | 3056795 | 8/2016 |
| KR | 20170096727 A | 8/2017 |
| KR | 101788751 B1 | 10/2017 |
| TW | 200505758 A | 2/2005 |
| WO | 2015000708 A1 | 1/2015 |
| WO | 2017101968 A1 | 6/2017 |
| WO | 2017162977 A1 | 9/2017 |

OTHER PUBLICATIONS

Chinese Office Action issued in corresponding Chinese Application No. 201880084954.1, dated Jun. 25, 2021, 5 pages.
Chenghai Xu et al. "Vacuum Cryogenic Technology and Equipment", 2nd edition, Sep. 2007, p. 252.
Second Chinese Office Action issued in corresponding Chinese Application No. 201880084954.1, dated Apr. 1, 2022, 14 pages.
India Office Action issued in corresponding Indian Application No. 202027026227, dated Feb. 28, 2022, 6 pages.
European Office Action issued in corresponding European Application No. 18 819 382.5, dated Oct. 14, 2022, 7 pages.

* cited by examiner

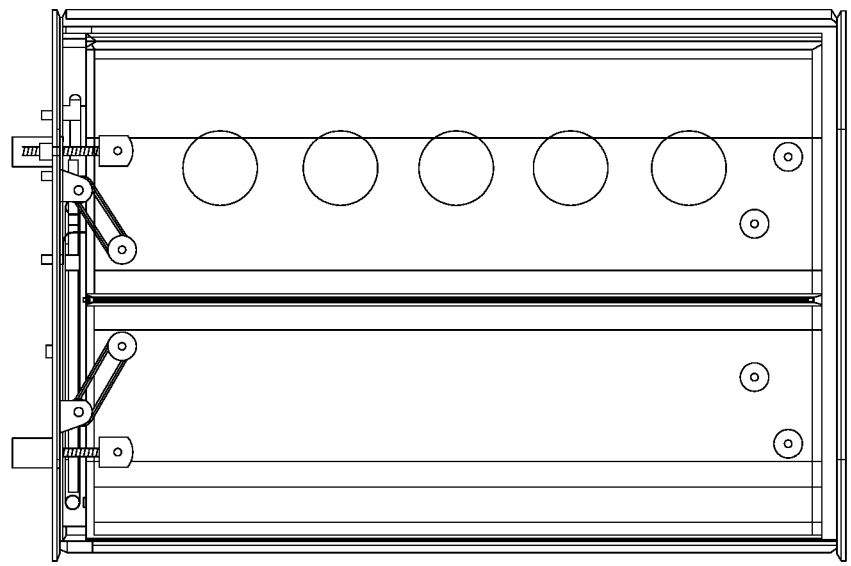
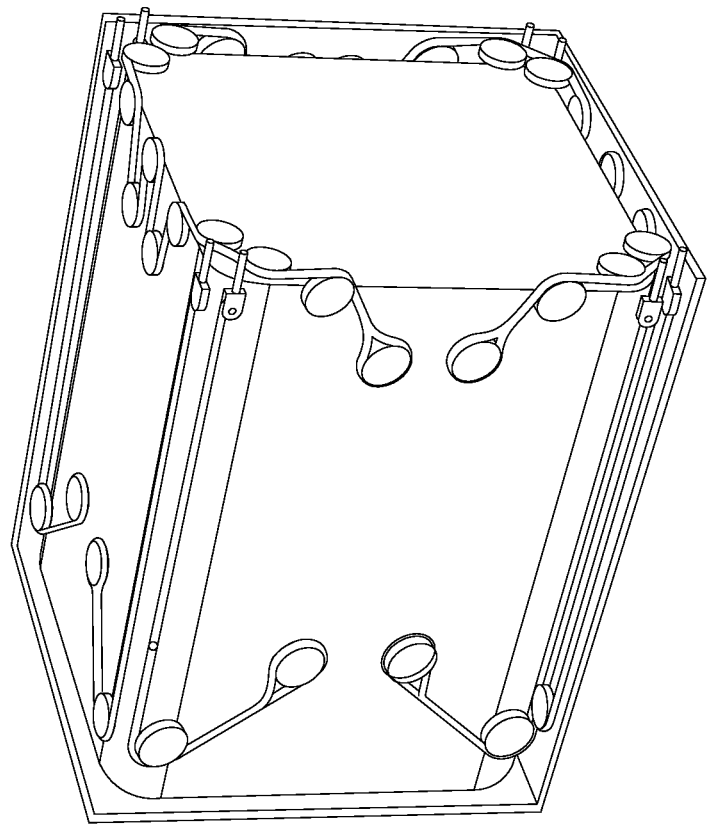
FIG. 9

| Temp | Press (MPa) | Liq Dens (kg/m3) |
|---|---|---|
| 100 | 0.034378 | 438.89 |
| 105 | 0.056377 | 431.92 |
| 110 | 0.088613 | 424.78 |
| 115 | 0.13221 | 417.45 |
| 120 | 0.19143 | 409.9 |
| 125 | 0.26976 | 402.11 |
| 130 | 0.36732 | 394.04 |
| 135 | 0.49006 | 385.64 |
| 140 | 0.64118 | 376.87 |
| 145 | 0.82322 | 367.65 |
| 150 | 1.04 | 357.9 |
| 155 | 1.295 | 347.51 |
| 160 | 1.5931 | 336.31 |
| 165 | 1.9351 | 324.1 |
| 170 | 2.3283 | 310.5 |
| 175 | 2.7766 | 294.94 |
| 180 | 3.2853 | 276.13 |
| 185 | 3.8617 | 253.36 |
| 190 | 4.5186 | 200.78 |

| Temp | Press (MPa) | Liq Dens (kg/m3) | Vap Dens (kg/m3) | Liq Enth (kJ/kg) | Vap Enth (kJ/kg) |
|---|---|---|---|---|---|
| 95.08 | 0.02 | 445.6 | 0.40261 | -57.003 | 480.94 |
| 98.712 | 0.03 | 440.66 | 0.59543 | -44.661 | 487.81 |
| 101.48 | 0.04 | 436.84 | 0.77603 | -35.232 | 492.94 |
| 103.74 | 0.05 | 433.69 | 0.95908 | -27.365 | 497.05 |
| 105.67 | 0.06 | 430.97 | 1.1336 | -20.821 | 500.5 |
| 107.36 | 0.07 | 428.57 | 1.294 | -14.973 | 503.48 |
| 108.87 | 0.08 | 426.4 | 1.4635 | -9.7265 | 506.1 |
| 110.25 | 0.09 | 424.42 | 1.6293 | -4.9513 | 508.44 |
| 111.51 | 0.1 | 422.59 | 1.7986 | 0.55734 | 510.58 |
| 112.67 | 0.11 | 420.88 | 1.9597 | 3.5214 | 512.5 |
| 113.76 | 0.12 | 419.26 | 2.1216 | 7.3347 | 514.28 |
| 114.76 | 0.13 | 417.77 | 2.3836 | 10.021 | 515.93 |
| 115.74 | 0.14 | 416.34 | 2.4446 | 14.31 | 517.46 |
| 116.66 | 0.15 | 414.98 | 2.6249 | 17.528 | 518.9 |
| 117.52 | 0.16 | 413.67 | 2.7644 | 20.503 | 520.25 |
| 118.35 | 0.17 | 412.42 | 2.9293 | 23.522 | 521.92 |
| 119.14 | 0.18 | 411.22 | 3.0816 | 26.33 | 522.72 |
| 119.99 | 0.19 | 410.06 | 3.2393 | 29.028 | 523.86 |
| 120.62 | 0.2 | 408.95 | 3.3946 | 31.626 | 524.93 |
| 121.32 | 0.21 | 407.87 | 3.5533 | 34.133 | 525.97 |
| 122 | 0.22 | 406.82 | 3.7097 | 36.557 | 526.95 |
| 122.65 | 0.23 | 405.8 | 3.8656 | 38.903 | 527.89 |
| 123.28 | 0.24 | 404.81 | 4.0212 | 41.179 | 528.79 |
| 123.9 | 0.25 | 403.85 | 4.1765 | 43.389 | 529.65 |
| 124.49 | 0.26 | 402.91 | 4.3314 | 45.538 | 530.47 |
| 125.07 | 0.27 | 402 | 4.4861 | 47.63 | 531.27 |
| 125.63 | 0.28 | 401.1 | 4.6405 | 49.668 | 532.03 |
| 126.18 | 0.29 | 400.23 | 4.7947 | 51.657 | 532.77 |
| 126.71 | 0.3 | 399.38 | 4.9486 | 53.598 | 533.48 |

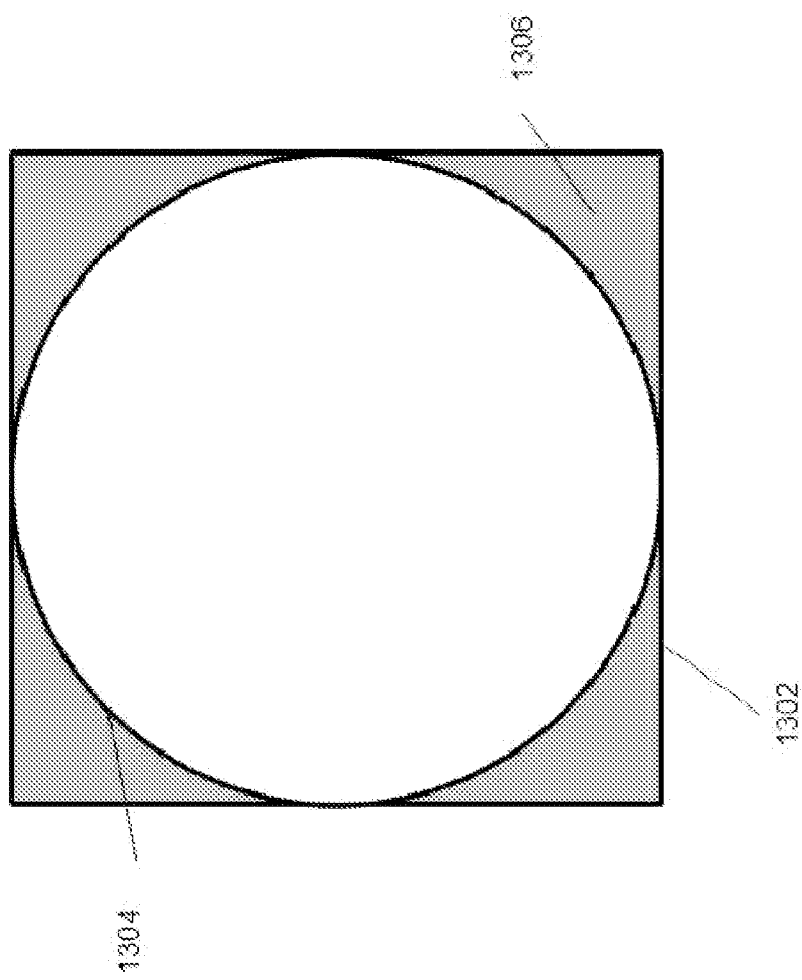

1400

1402: placing an inner storage vessel within an outer vessel, wherein the inner vessel is adapted to store liquid methane 1404: attaching said inner storage vessel to said outer storage vessel using a support system, wherein said support system comprises a rope suspension system, and wherein at least one of said inner and outer vessels have a non-cylindrical cross-section

FIG. 14

LIQUID METHANE STORAGE AND FUEL DELIVERY SYSTEM

CROSS REFERENCE TO RELATED APPLICATION

This application is a 35 U.S.C. 371 National Phase Entry Application from PCT/IB2018/059148, filed Nov. 20, 2018 which claims priority to Great Britain Patent Application No. 1719399.6, filed Nov. 22, 2017, the disclosures of which are incorporated herein in their entirety by reference, and priority is claimed to each of the foregoing.

TECHNICAL FIELD

Disclosed are embodiments relating generally to cryogenic storage and the storage of liquid methane, as well as its delivery as fuel, for instance to power generation systems such as engines.

BACKGROUND

The cryogenic nature of the storage of liquid methane and its delivery as a fuel to engines and other power generation systems can present several technical challenges as compared to conventional, non-cryogenic liquid fuels such as diesel, gasoline, and butane.

For example, in terms of storage, to minimize the loss of methane gas through venting, a typical storage tank 100 is illustrated in FIG. 1. Often, such a tank is able to extend the period over which the methane can remain liquid by storing it in a high pressure vacuum insulated vessel, and can include an outer vacuum jacket 102, an inner vessel 104, super insulation 106, and an evacuation port 108.

The typical tank pressure and hold times for liquid methane stored in a tank as illustrated in FIG. 1 are provided in FIG. 2A. In this example, the pressure and hold-times are provided in accordance with the saturation-vapor curve illustrated in FIG. 2B (table data obtained from CRC Handbook of Chemistry and Physics 44$^{th}$ ed.). This curve shows a relationship between equilibrium pressure and temperature for liquid methane, where the curve is based on:

$$\log_{10} P_{mm\ Hg} = 6.61184 - \frac{389.93}{266.0 + T^\circ\ C.}$$

Above a critical point of −82.6 C, methane requires impracticable pressures to keep it as a liquid.

To extend the passive, venting free period to meet the typical industrial requirements of 5 days from filling, the vapor pressure in the tank typically increases over the range of 8 to 15 bar over the 5 days before venting must take place. The high pressure of these systems is used to achieve high flows of liquid, for instance as a fuel source, when an output valve is opened.

Thus, there remains a need for improved hold times, as well as storage and delivery of methane fuel using a low pressure system.

Additionally, given the pressure constraints of existing systems, storage vessels must be cylindrical in cross-section, with a centrally located short pipe for output. Thus, there remains a need for alternative shaped arrangements, with flexibility regarding piping and access. For instance, for use in vehicles.

Liquid methane storage systems, including with the use of an internal cooling unit, are provided in US2014352332 (WO2013093601), which is titled "Liquid Methane Storage System and Method," filed Jun. 27, 2013.

SUMMARY

According to some embodiments, a cryogenic storage tank is provided. For example, a methane storage tank having an outer vessel and an inner storage vessel arranged within the outer vessel, which is adapted to store liquid methane is provided. In certain aspects, the storage tank includes a support system for connecting the inner and outer tanks, where the support system comprises a rope suspension system, such that the inner storage vessel is prevented from directly contacting said outer vessel. The space between the vessels may be, for example, vacuum. In some embodiments, the inner storage vessel is arranged within the outer vessel without a metal supporting collar. The storage tank can be mounted in a vehicle, such as a truck or tractor, and connected to a combustion engine. For instance, the tank may be arranged to deliver methane to the combustion engine of the vehicle.

According to some embodiments, a methane storage tank is provided, which includes an outer vessel and an inner storage vessel arranged within the outer vessel. In certain aspects, the tank also includes a support system for connecting the inner and outer vessels. According to some embodiments, the storage tank is a low pressure tank where liquid methane is stored at a pressure in the range of 1-3 bar and with a hold time of at least 5 days.

According to some embodiments, a methane storage tank is provided, which includes an outer vessel and an inner storage vessel arranged within the outer vessel. In certain aspects, the tank also includes a support system for connecting the inner and outer vessels. According to some embodiments, the inner storage vessel has a non-cylindrical shape. For example, in some instances, it has a square or rounded rectangular shape in cross-section.

According to some embodiments, the support system can be made from rope, which may include, for example, a fixing loop formed by splicing. The rope may be made from, for instance, synthetic fibers such as aramid and para-aramid synthetic fibers. The suspension system may also make use of a threaded tensioning arrangement and/or Belleville washers. The system may also include one or more of pulleys and wheels. In some embodiments, at least one of the inner and outer vessel comprises an ultrasonic transducer configured to provide data regarding the level of methane in an inner storage vessel based an ultrasonic signal through the inner storage vessel. In some aspects, the tank further comprises a thermocouple fixedly attached to an outer surface of an inner storage vessel, and/or the tank further comprises an output line, wherein the output line has a pressure sensor. In some embodiments, a processor can be used to send data relating to one or more of pressure, temperature, and methane level to a central control facility.

According to some embodiments, a fuel delivery system, such as for a truck or tractor, is provided. The system could include, for instance, a storage tank adapted to store liquid methane, a heat exchanger coupled to the storage tank and configured to process methane extracted from the storage tank, and a first compressor coupled to the heat exchanger and configured to pressurize the methane processed by the heat exchanger. In some embodiments, the heat exchanger is sized with sufficient capacity to normalize the temperature of the gas from the tank over the full range of operating conditions such as to ensure that the gas feed to an engine is not too cold. The system may also include a combustion engine coupled to the first compressor, where the combustion engine is configured to operate using the pressurized methane; a second compressor coupled to the storage tank; and an auxiliary power unit coupled to at least one of the compressors. In some examples, the second compressor is arranged to act in parallel with the first compressor, for instance, to deliver additional methane gas to the engine on-demand. According to some embodiments, the second compressor also acts independently of the first compressor to supply methane gas for storage in a high pressure buffer or to drive a refrigeration circuit of the storage tank. Additionally, where the combustion engine is part of a vehicle, the auxiliary power unit may be configured to provide power during a start-up of the vehicle or to provide power and heat to the vehicle's quarters.

According to some embodiments, a method of assembling a methane storage tank is provided. This could include, for instance, placing an inner storage vessel within an outer vessel, where the inner vessel is adapted to store liquid methane. The method may also include attaching the inner storage vessel to the outer storage vessel using a support system having a rope suspension system. In some examples, at least one of the inner and outer vessels have a non-cylindrical cross-section, such as square or rounded rectangular. According to some embodiments, the method of fabrication is designed to ensure that the tensioning of the rope supports can be achieved through vacuum sealed ports without the need for the outer tank to be opened.

According to some embodiments, a method of operating a vehicle, such as a truck or tractor, is provided. This could include filling a storage tank and operating the vehicle with a combustion engine powered by methane from the tank. The tank could be, for example, one of the tanks described in the embodiments disclosed herein.

BRIEF DESCRIPTION OF THE DRAWINGS

The accompanying drawings, which are incorporated herein and form part of the specification, illustrate various embodiments.

FIG. 9 illustrates a storage vessel according to some embodiments.

FIGS. 10-12 illustrate data according to some embodiments.

FIG. 13 illustrates a storage vessel according to some embodiments.

FIG. 14 illustrates a process according to some embodiments.

Together with the description, the drawings further serve to explain the principles of the disclosure and to enable a person skilled in the pertinent art to make and use the embodiments disclosed herein. In the drawings, like reference numbers indicate identical or similar functionally.

DETAILED DESCRIPTION

Figure 1:
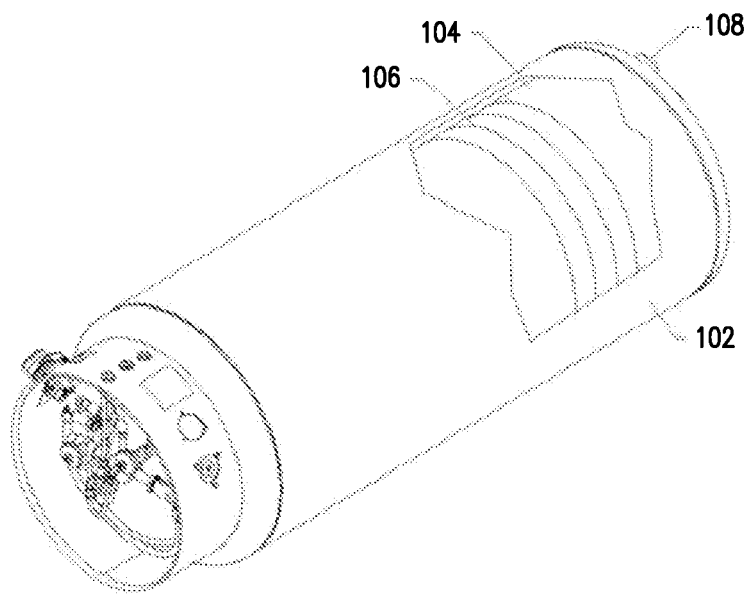
FIG. 1. illustrates a storage tank.
Figures 2A, 2B:
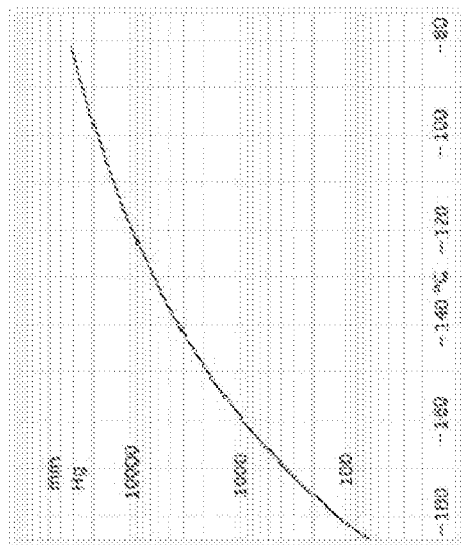
FIGS. 2A and 2B illustrate pressure information.

Aspects of the present disclosure address certain issues with existing systems, which are typically high pressure.

While existing systems can be simple to fabricate and operate, and are able to achieve very high flows of liquid when the output valve is opened, they have numerous limiting characteristics. Such characteristics can include one or more of: (1) an inherent time limit over which methane is contained before excess gas must be vented, which is harmful to the environment and needs to be carefully controlled to prevent explosions; (2) operation at high pressure, which typically necessitates a cylindrical cross section with rounded ends, which in turn can reduce the quantity of liquid that can be fitted into a given length, width and height, reducing the effective energy storage capacity of the tank; (3) resultant limitations regarding the range of any vehicle using such systems, and/or limits on duration and range over which a power generator can function; (4) to reduce stress, all exit pipework typically must be taken out though the central portion of the tank meaning very short output pipes are often required, thereby increasing heat flow into the main methane volume through conduction; (5) a very short supporting collar used between the inner liquid methane tank and the outer vacuum jacket to minimize flexure of the connecting pipework and prevent relative movement between the tanks that could result in the inner tank touching the outer tank; however, this short supporting collar increases the heat flow into the main methane reservoir; (6) the mass density of methane at the corresponding elevated temperatures is significantly lower than liquid methane at lower temperatures again reducing the effective energy storage capacity of the tank which in turn limits the range of a vehicle or time over which power can be generated; (7) at higher pressures, due to the lower density of the liquid methane an increased ullage space of typically 10% is required to prevent rupture through hydraulic pressure build up as the liquid methane expands; (8) during periods of extended high output flow the inner tank pressure reduces resulting in eventual fuel starvation to the vehicle or power generator. Indeed, certain systems may rely on a heat leak into the tank to boil off sufficient methane to supply the engine, which can be a compromise to the overall system performance in some scenarios. In some instances, a significant challenge for the use of methane as a replacement fuel for vehicles is storing sufficient quantities to provide the range for the typical existing transportation and power generation applications, and doing so without overly increasing the size of the vehicle or power generation form.

Aspects of this disclosure relate to solving issues with existing systems, including one or more of the above issues, and generally to the storage of liquid methane in its most energy dense form in the most space efficient shapes and volumes. This may also include the delivery of methane as a gaseous fuel in the highest possible continuous flow in engines and other power generation systems. In some embodiments, this is irrespective of level of demand or duration, at least until the entire contents of the tank has been exhausted.

Liquid methane can be over 621 times more energy dense than methane gas at room temperature but can typically only be stored as a liquid cryogenically due to its natural physical properties. Cryogenic liquid storage often involves keeping the liquid as cold as possible for as long as possible without sufficient pressure build up that would necessitate venting gas. Traditional solutions achieve this by insulating the liquid vessel using a vacuum jacket and designing the supporting structure and pipework to minimize heat ingress, for instance, as illustrated in FIG. 1. Nevertheless, heat will always get into the liquid vessel causing the liquid cryogen to boil giving off gas. Eventually, if the gas pressure is not released the pressure of the liquid vessel will increase until the vessel explodes. There are other hazards.

For instance, methane should not be released into the environment unless necessary as it is a powerful global warming gas and damages the environment. It also presents a safety hazard due to its explosive nature. For this reason current liquid methane vehicle regulations (UN R110) stipulate that a liquid methane tank should be able to hold the methane within the tank for a minimum of 5 days.

Embodiments can overcome these and other limitations by, for example, providing an inner vessel supporting design that dramatically reduces heat ingress into the liquid methane vessel thereby extending the hold time for the industry standard R110 requirement of non-venting period of 5 days over the pressure range of 8-15 bar range. For instance, hold time can be extended to 25 days, or even 50 days over the same range according to some embodiments. This improved duration performance could be used, in certain aspects, to meet a non-venting period of 5 days over the reduced pressure range of 1-3 bar. At pressures of 1-3 bar liquid methane is held in a much denser energy state of up to 30% at the saturated vapor temperature as shown in FIG. 10. In certain aspects, a reduced pressure range of 1-3 bar can mean that the materials of construction of the tank do not need to be massive to contain the pressure, allowing for more freedom of design (e.g. a rectangular tank). For more complex designs, and in some embodiments, the pressure may be limited to lower values. Similarly for simpler designs, a higher pressures could be accommodated in some cases.

According to some embodiments, a supporting structure is provided. In some embodiments, it is used in conjunction with an inner braced strengthening and fabrication process to allow the liquid methane and vacuum jacket vessel designs that allow arbitrary shaped liquid methane vessels.

According to some embodiments, the incorporation of one or more compressors sized to provide the required gas flow rate is described. This can, in some embodiments, effectively isolate the cryogenic tank performance from the methane delivery requirement. In some embodiments, an auxiliary power unit can be used to provide additional power and heat for use during cold start and supplementary applications. The system can include a pressure booster to provide a high pressure reservoir of methane gas for use on cold start and auxiliary power generation in isolation of the cryogenic reservoir. In some embodiments, the incorporation of a gas liquefaction system to condense any unused methane gas back to liquid and simultaneously cool the liquid methane reservoir according to demand can be included. According to embodiments, with a gas liquefaction system, fuel may be stored for extended periods and used in uninterruptable power supplies.

Figure 16:
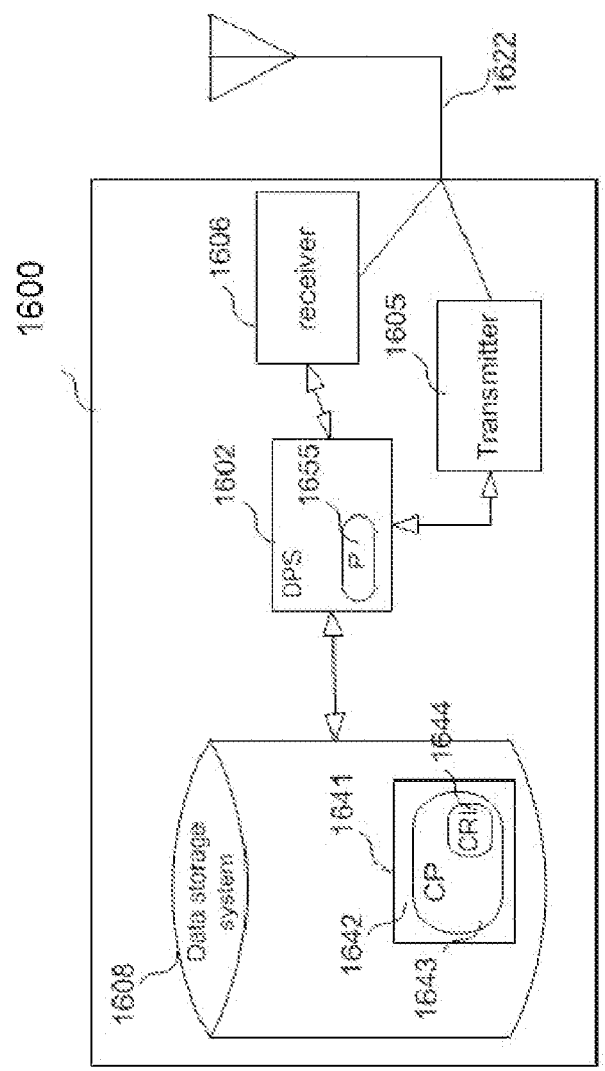
FIG. 16 illustrates a control unit according to some embodiments.

According to some embodiments, a controller can be used to manage the condition of the tank and methane delivery. By way of example, the incorporation of an Internet or other network link, for instance, via SATCOMS and/or terrestrial network, can be provided. For instance, communications can be to a central control station for the monitoring and control of the methane storage and delivery system. An example of a control system is shown in FIG. 16.

In some embodiments, a lightweight composite material is used for an inner liquid methane tank and outer vacuum jacket. A fire resistant material may be used, for instance, for the outer jacket. Examples of materials that may be used for one or more of the tank and jacket include aluminum, Kevlar® (or similar), and carbon fiber. Other suitable materials may include those sufficient to meet the R110 regulation's requirement of a "bonfire" test for a road-going tank.

Methane is the primary component of natural gas, which provides an increasing percentage of centralized power generation. Due to its physical properties, it can presently only be stored as a liquid using cryogenics restricting the period over which it can be stored before the storage vessel must vent and also complicating the need for it to be converted into a gaseous phase for use as a fuel for power generation. Storage as a liquid enables convenient transportation and efficient use of storage space. In particular, when used as a fuel for high powered combustion engines for transportation purposes, there is a need to store as much liquid within smallest space as possible and be able to supply sufficient quantities of fuel on demand. In particular, the energy density of liquid methane is sufficiently high to replace the liquid fossil fuels such as petrol and diesel used to power heavy goods vehicles, however, the current technology uses high pressure cryogenic storage tanks that are required to have a cylindrical cross section thus limiting the volume of fuel that can be contained within a given space envelope.

A pressurized tank can provide the initial means to force the movement of liquid methane. This can be, for instance, through a vaporizer heated by waste heat from a cooling system to create the gaseous fuel often required by an engine. However, under continuous heavy load such as a long climb the pressure in the methane tank can drop to the point whereby there is insufficient fuel flow to the engine resulting in starvation and power drop. Aspects of this issue are addressed by embodiments disclosed herein.

In addition, intermittent renewable energy sources such as wind, solar, tidal, hydro-electric and wave power have a severe limitation in that they often do not produce electricity when there is a requirement for it and yet take hold over significant access to the electrical infrastructure. Alternatively, many producers of biomethane are located in areas where there is limited grid access and so cannot increase their power output during these periods. By converting the biomethane to liquid in compact storage vessels that can be transported the biomethane can then be used to fuel stand-by power generators located at the renewable energy sites where there is electricity grid access to cover those times when there is insufficient solar, wind power etc. However, in order to meet the high power levels required there is a need to supply large quantities of gaseous methane instantaneously on demand for indefinite periods which is an issue for the existing high pressure storage systems used. In addition, the storage before venting problem is compounded as it may be necessary to store the liquid methane for months rather than days.

According to some embodiments, a system for the indefinite non-venting storage of liquid methane at low pressure and its continuous conversion to a high gaseous methane flow rate at a pressure that is independent to the natural vapor pressure of the methane reservoir is provided.

Figure 3:
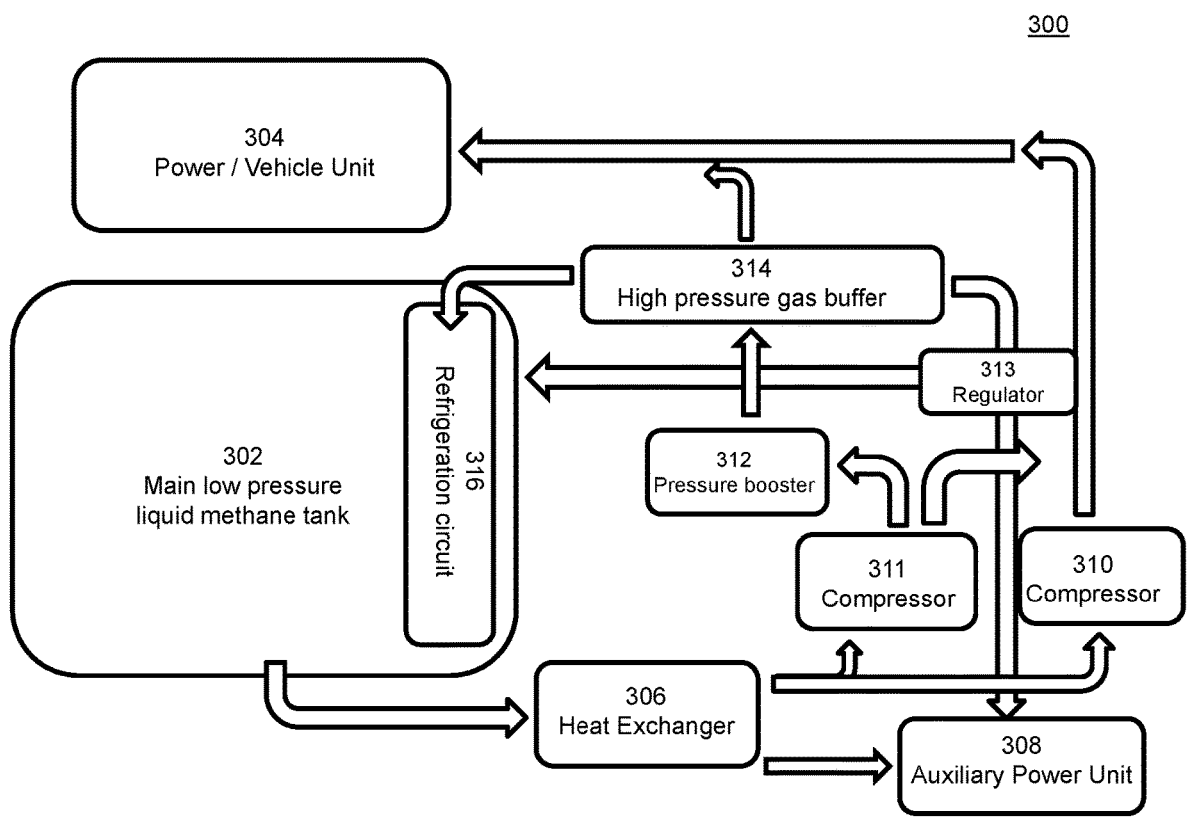
FIG. 3. illustrates a system for the storage and delivery of fuel according to some embodiments.

Referring now to FIG. 3, a system 300 for the storage and delivery of a fuel, for instance methane, is provided according to some embodiments. The system may comprise a low pressure fuel storage tank 302. In some embodiments, tank 302 has a non-cylindrical cross-section, such as a square or rounded rectangular cross-section. Although square and rounded rectangle shapes are used in this example, other non-cylindrical cross-sections could be used. Additionally, the tank 302 could have a complex shape, for instance, an "L" shape. The system may also include a heat exchanger 306, an auxiliary power unit 308, a liquefaction/refrigeration circuit 316, a gas compressor 310, and a high pressure buffer and booster 314 and 312. The system may be configured so that the liquid methane is held at the lowest possible temperature, thereby increasing the energy density to its maximum.

In some embodiments, upon receiving a demand for gaseous methane, the compressor 310 is powered up, forcing gas into the engine 304. Gas may also be forced back into the tank via a regulator, pressurizing the tank to force more liquid methane out through the heat exchanger 306, where it is vaporized before being compressed and forced into the engine to continue the cycle. That is, gas may be passed to the tank 302 from compressor 310 (or 311) via regulator 313. In this way, the components of system 300 may be used in conjunction to simultaneously deliver the necessary fuel to unit 304 (e.g., an engine) while ensuring that additional fuel will be vented from tank 302 for sustained delivery and use.

According to some embodiments, a second compressor 311 may be used. The second compressor can be coupled to the tank 302. In some embodiments, the second compressor 311 is placed in parallel with the first compressor 310 to deliver methane gas under high demand. In some embodiments, the second compressor 311 may be arranged to act independently of the first compressor 310 to supply methane gas to a pressure booster, such as booster 312. This may be, for instance, to achieve high pressure for storage in the high pressure buffer 314 or to drive a cooling unit, such as refrigeration circuit 316. As illustrated in FIG. 3, and in some cases, regulator 313 may be further connected to compressor 311 and used to direct gas to one or more of buffer 314 and tank 302. Although depicted as a single component, in some instance, regulator 313 may comprise a plurality of regulation components, including one or more valves. According to some embodiments, the first and second compressors 310, 311 can be located anywhere on the vehicle serviced by the necessary pipework, control, and power cables. In some instances, one or more of the compressors takes gas at low pressure, for example, 3 bar, and delivers it to an engine at higher pressure, such as 10 bar. This could be, in some embodiments, with a combined output rate of 16 grams per second.

By way of example, during normal vehicle cruising operation one compressor (e.g., compressor 310) could be sufficient to deliver methane at a first level, such as at 8 grams per second to the engine. In this instance, the second compressor could be reserved for additional tasks, as required. As an example, the second compressor (e.g., 311) could be used to supply gas to a pressure booster and/or fill a high pressure buffer. According to some embodiments, when there is a need to cool a fuel stored in a tank, such as liquid methane in tank 302, high pressure methane from the buffer or from the output of a pressure booster can be passed through a refrigeration element, such as a Joule Thompson refrigeration circuit inside the tank, re-condensing the methane to a liquid that is colder than the main reservoir. This could increase the hold time left before the methane would need to be vented, or make additional space available for fresh fuel because the colder methane is denser.

According to some embodiments, initial start-up of a vehicle, including for instance starting power/vehicle unit 304, can be achieved using fuel stored in a high pressure buffer, such as buffer 314, which can store methane gas. This could allow, for example, the first compressor 310 to start independently of the pressure in the main tank 302, which may be low according to some embodiments. In certain aspects, once the compressor 310 is running, a regulator 313 can be used to bleed some gas into the main tank. In some embodiments, gas is bled to the main tank 302 at 3 bar. In some respects, the main tank pressure is therefore set independently of the liquid methane vapor pressure. According to embodiments, for instance in situations that require high gas flow, a pressure raising circuit can be incorporated. This can enable the pressure of the tank to be increased by boiling off some of the liquid, for example through a heat exchanger attached to the inside wall of an outer vacuum vessel. In this way, pressure in the tank can be maintained during periods of high usage In certain aspects, auxiliary power unit 308 can serve a number of roles. According to embodiments, it can be positioned anywhere on a vehicle and connected via the necessary pipes. It can be used to extract energy from the methane gas that would otherwise have to be vented when the pressure in the methane tank is rising but the vehicle or generator is not being used. Electrical energy may be generated by unit 308, for instance, with a fuel cell arrangement and/or a secondary combustion engine by using some of the methane. The electrical energy can be stored in a battery.

According to some embodiments, auxiliary power unit 308 can be also be used to provide power and/or heat to a vehicle's quarters, including for instance a cabin or "hotel" load when the driver is sleeping overnight. For very cold starts, for example, it can be run exclusively from the high pressure buffer to generate heat for the heat exchanger, e.g. heat exchanger 306, that vaporizes the liquid methane before the vehicles main engine is sufficiently warm.

According to some embodiments, system 300 may operate in a state in which a tank is at an increased pressure. For example, they system may operate when the storage tank 302 has been left for a period of time allowing heat to boil the stored fuel, such as liquid methane, thereby increasing the pressure. According to embodiments, a valve is opened for feeding the excess methane gas to an auxiliary power unit (such as a combustion engine or fuel cell) where power is generated and stored in a battery. This could be unit 308, for instance. Power from the battery can then be used to power a compressor to take excess gas from the tank and pass it through a pressure booster (e.g., booster 312) and cooling unit (e.g., refrigeration circuit 316) to re-liquefy excess gas and return it to the main reservoir. This can advantageously reduce the main reservoir's temperature and extend its non-venting storage time. Alternatively, and according to some embodiments, a compressor and booster can be used to take low pressure gas from the main tank and store it in a highly compressed gaseous state in a high pressure buffer, such as buffer 314, that acts as an independent reservoir that can be used to initiate the starting sequence of the main engine or supply the auxiliary power unit as required.

Although one larger low pressure compressor could be used, according to some embodiments, to supply sufficient gas to the engine when under maximum demand the use of two lower flow compressors acting independently may be used. In some cases, under normal operation, one compressor can fulfil the sufficient fuel delivery saving energy. Further, to provide a high pressure buffer volume the second compressor can be used independently. By pumping gas through a pressure booster a high pressure reservoir can be filled. This can then be used to either power the engine during a cold start or keep the liquid reservoir cold by passing through a Joule Thompson refrigeration system positioned within the inner liquid methane tank. This system can be used to keep the main reservoir cold, thereby sustaining low pressure operation.

Often, a cryogenic liquid methane storage tank will allow the pressure of the gas to increase according to the saturation pressure as the liquid methane warms. This is possible until the temperature of the liquid methane reaches the critical temperature of 161 kelvin. At this point, no amount of pressure can keep the methane in a liquid state (definition of critical temperature) and so either the excess gas pressure is released or the tank explodes if the mechanical strength of the tank is exceeded. Although the methane is kept in a liquid state, as it warms its density is reduced by up to 30% compared to its density at atmospheric pressure. This means that for a given volume the energy density is also reduced, which in the case of a fuel tank for a vehicle can have numerous downsides, including one or more of reduced range, e.g., to heavy goods vehicles or operation time in the case of agricultural tractors, and inefficient use of space. This can be a serious disadvantage when compared to other liquid fuels, such as diesel. The methods and systems described herein can allow the methane to be kept at low pressure such as atmospheric or even lower, thereby ensuring that the maximum energy density of the fuel tank is maintained providing significant advantages over the traditional high pressure methane tank.

Figure 11:
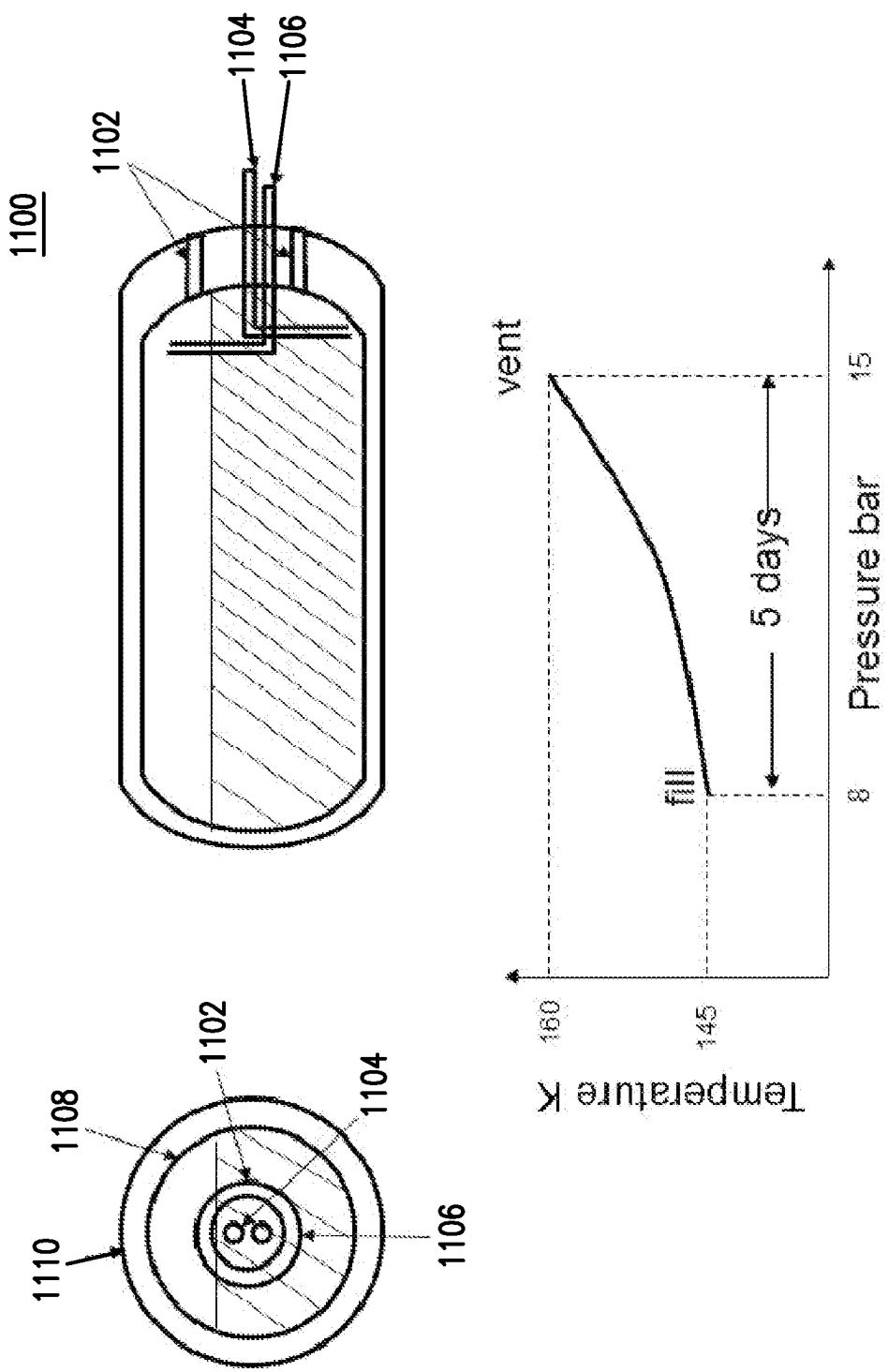

In some instances, a cryostat is designed to suspend an inner liquid vessel from an outer vacuum vessel by means of a stainless steel supporting collar. In the case of a horizontally supported liquid vessel the support has to be sufficiently strong to hold the entire weight of the inner liquid methane tank. Moreover, in order to maximize the amount of volume for the inner tank the space between the outer vacuum vessel and the inner liquid tank must be minimized. The supporting collar therefore should be short and stout, and because a cylindrical cross section must be maintained the decanting pipe and venting pipe must be taken out through the center. This is illustrated, for instance, in the arrangement 1100 of FIG. 11, with a short supporting collar 1102, short output pipe 1104, and short vent pipe 1106 for a methane tank 1108 within vacuum tank 1110. The arrangement 1100 results in a supporting structure that allows significant heat flow from the outside vacuum jacket 1110 into the inner liquid tank 1108, reducing the time it takes for the liquid to reach the design pressure at which the gas must be vented. In this arrangement 1100, from the point at which liquid methane is put into the tank 1102 at 8 bar, the tank can maintain a liquid state of methane for five days before it must be vented (e.g., upon reaching 15 bar, which is the regulatory requirement as set out in R110). The short distance between the supporting collar and the outer tank means that the pipe 1104 through which the liquid methane is extracted is also short meaning that again the heat conductivity is higher.

Figure 4A:
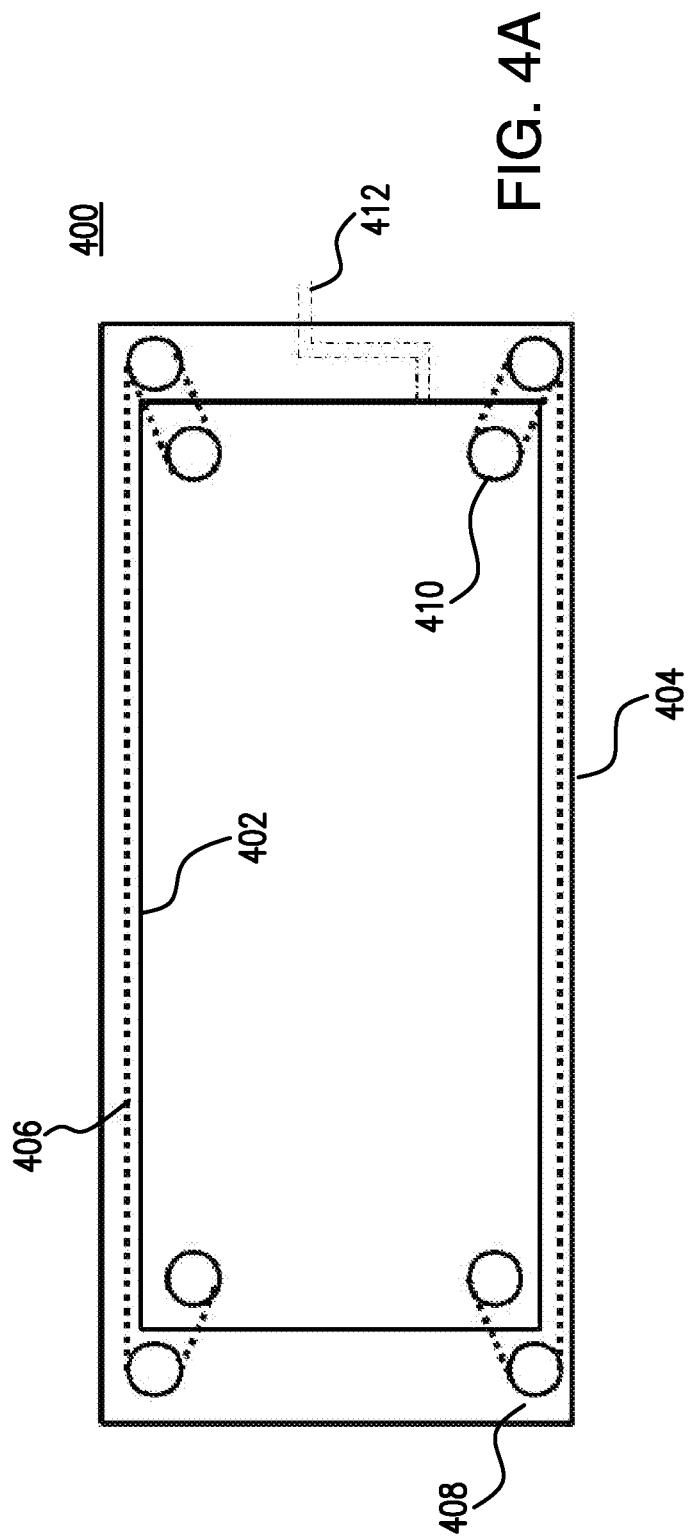
FIGS. 4A and 4B illustrate a storage system according to some embodiments.
Figure 4B:
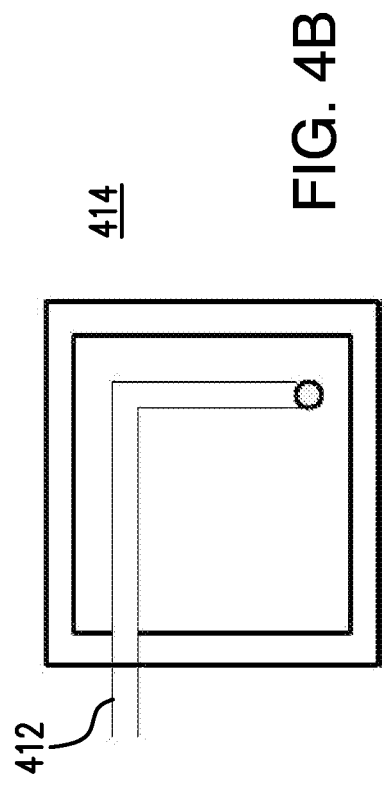

Referring now to FIGS. 4A and 4B, a storage tank 400 is provided according to some embodiments. The tank may include, for instance, an inner vessel 402 and an outer vessel 404, with a support system 406. The support system can be used to connect the inner vessel 402 with elements 410 to the outer vessel 404 with elements 408. A piping system 412 may be used to extract fuel from the inner vessel 402, such as methane. Tank 400 could correspond, for example, to tank 302 of FIG. 3. That is, a system as set forth in FIG. 3 can implement a tank as set forth in FIGS. 4A and 4B in some embodiments, as well as those illustrated with respect to FIGS. 5-9. A side view 414 of piping 412 is shown in FIG. 4B. According to some embodiments, the system constrains the movement of the inner vessel 402 to prevent it from coming into contact with the outer vessel 404. According to embodiments, piping, such as fill or extraction piping, need not be centrally located on tank surfaces. For example, a pipe could enter/exit a vessel near an edge.

Instead of using a supporting stainless steel collar, some embodiments use lengths of rope. These may be, for instance, a synthetic fibrous material, such as Kevlar® rope, to support the inner tank from the outer tank. According to embodiments, the rope material has very low heat conductivity, and in some cases, because relatively long lengths are used, the time taken for the liquid methane to warm to the critical temperature can be increased dramatically. For example, according to embodiments, the time is increased by a factor of ten i.e., 50 days. In some embodiments, the use of rope to provide the inner tank support also allows a long thin walled pipe to be used to decant the liquid methane again reducing the heat loading of the inner tank again increasing the time that can be maintained before there is a need to vent gas. The rope may be made of a high strength, low thermal conductivity material in some embodiments. Although Kevlar® is used in this example, other suitable materials could be used.

Figure 12:
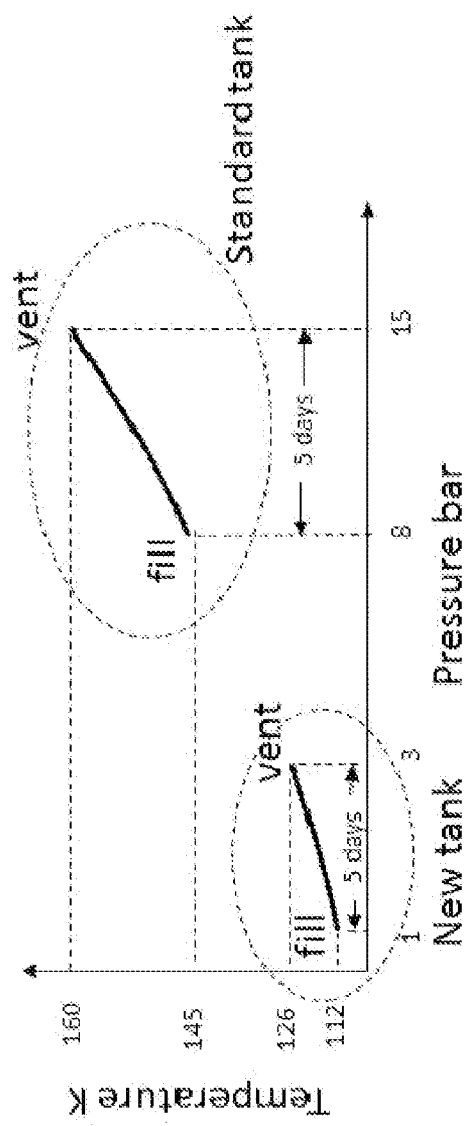

According to embodiments, and using a regulatory requirement for non-venting of five days as an example, liquid methane can be filled at a pressure of 1 bar and allowed to warm to the temperature at which the saturation pressure is 3 bar before pressure must be released of the same period of five days. In other words, and according to embodiments, the lower heat leak of the tank arrangement reduces the pressure build up, thus allowing the regulation to be met while retaining the features the lower system pressure and high liquid density. This means that for the reasons stated above, the liquid methane density and the energy density of the tank is higher. This is shown, for instance, in FIG. 12.

At this much lower pressure, cross-sections other than cylindrical designs can become possible. For example a square or curved rectangular cross-section 1302 can be used, as compared to cylindrical cross-section 1304, which allows a further increase in storage volume. For example, the amount of liquid methane 1306 and therefore energy that can be stored within the same overall envelope is shown in FIG. 13. Although a square shape is used in this example, other non-cylindrical cross-sections could be used. According to some embodiments, a tank could have a complex shape, for instance, an "L" shape. Indeed other more complex shapes can be considered for the overall tank construction such that it can be fitted into more convenient spaces within the vehicles overall design. This could be important for vehicles where space is constrained, such as on an agricultural tractor.

Synthetic-material ropes can be incredibly strong and provide more than enough tension between the outer vacuum vessel and the inner tank to support the weight of the inner tank and the liquid methane contained within it according to some embodiments. In certain aspects, this is true even if the tank is subjected to a mechanical shock such as that occurring during a collision of the vehicle. However, in order to minimize the heat loading into the inner tank the thinnest rope should be selected. In some embodiments, in order to attach the rope to the inner and outer tanks, use is made of capstans such as those used about yachts. However, when a knot is used to form a loop around which to fix to the capstan the knot becomes the weakest part of the structure as it pulls across the rope's fibers. A knot can reduce the strength of an arrangement by 50% or more, meaning a thicker rope must be used. Also a knot is wider than the rope itself and so increases the volume lost to the space taken up by the support structure.

In order to maximize the volume of the inner tanks for a given outer tank volume, according to some embodiments, a design is used that minimizes the gap between the inner and outer tanks. Some embodiments therefore make use of splicing to form a fixing loop in the rope material. The method of splicing can retain the integrity and strength of the rope. A loop splice (sometimes called an eye splice) can be formed by, for example, partially untwisting the rope then weaving the resultant strands together. This means that a high margin of safety can be used in the design. In the example of Kevlar®, such a splice maintains up to 80% of the breaking strain over the best knots, and also minimizes the space lost to the suspension system. In some embodiments, a large diameter capstan is used relative to the rope diameter, thereby increasing the area on which the rope rests to reduce stress and allow movement of the rope to balance forces. For example, a capstan could have a diameter of approximately 50-75 mm and be used with a rope diameter of 5-7.5 mm. Although Kevlar® is used in this example, according to embodiments, other suitable materials could be used.

Figure 5:
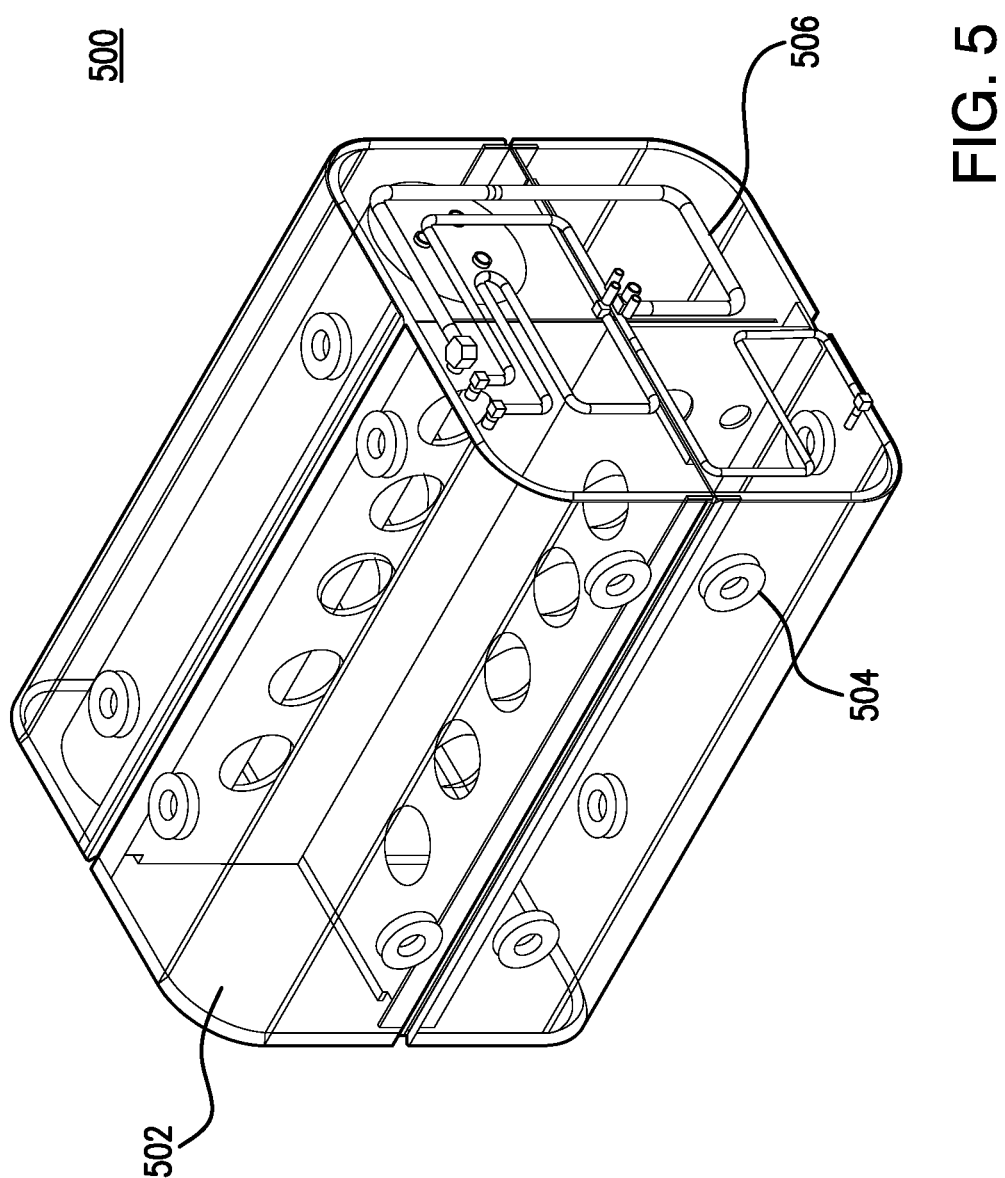
FIG. 5 illustrates a storage vessel according to some embodiments.

Referring now to FIG. 5, a storage vessel 500 is provided according to some embodiments. The vessel 500 may include an outer surface 502, one or more connection points, 504, for instance, for a suspension system, and piping 506. According to embodiments, storage vessel 500 may correspond to inner vessel 402.

Figure 6B:
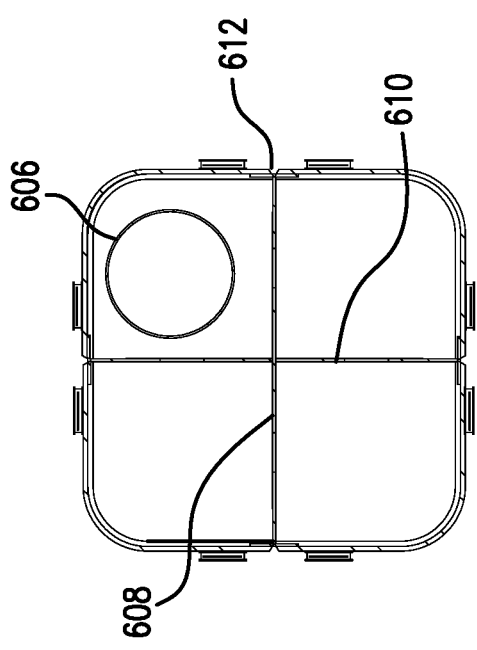
FIGS. 6A-6D illustrate a storage vessel according to some embodiments.
Figure 6D:
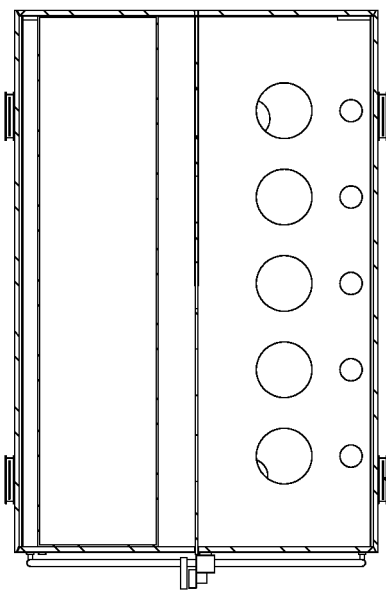
Figure 6A:
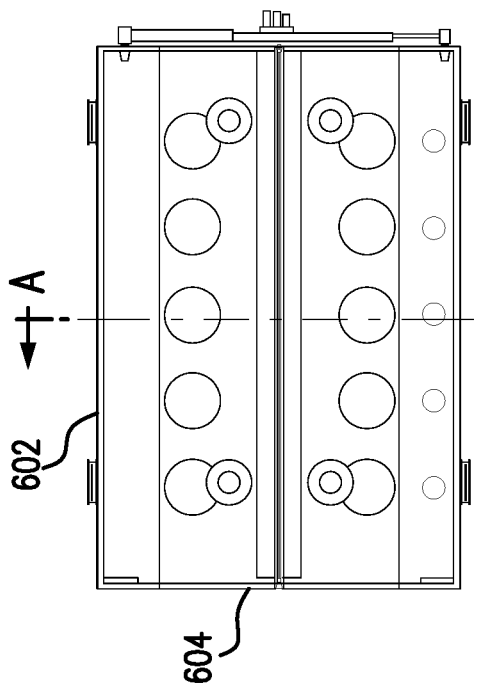
Figure 6C:
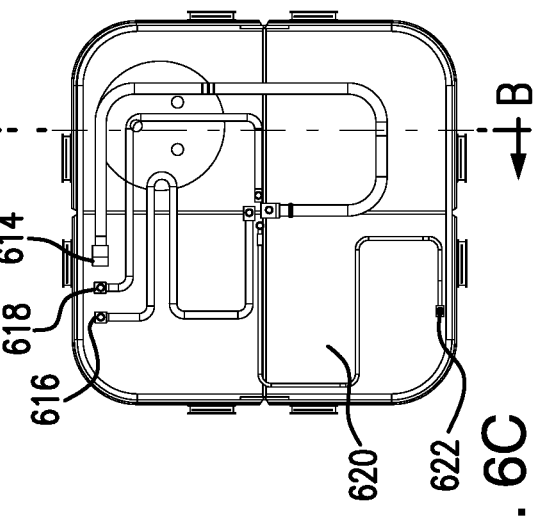

Referring now to FIGS. 6A-6D, detailed views of a storage vessel, such as vessel 500, are provided according to some embodiments. In this example, 602 is a rounded section and 604 is an end plate, rear side. FIG. 6B is a cross-section taken along "A" of FIG. 6A. As shown in the example of FIG. 6B, 606 is a ullage cylinder, 608 is a horizontal reinforcement, 610 is a vertical reinforcement, 612 identifies flanges, 614 is a fill line, 616 is vent line, 618 is a gas line, 620 is an end plate, side, and 622 is a liquid line. FIG. 6D is a cross-section taken along "B" of FIG. 6C. A connection point 624 is illustrated, which may be, for example, a capstan. In some embodiments, the capstans are positioned in the same dimension on each side.

Figure 7:
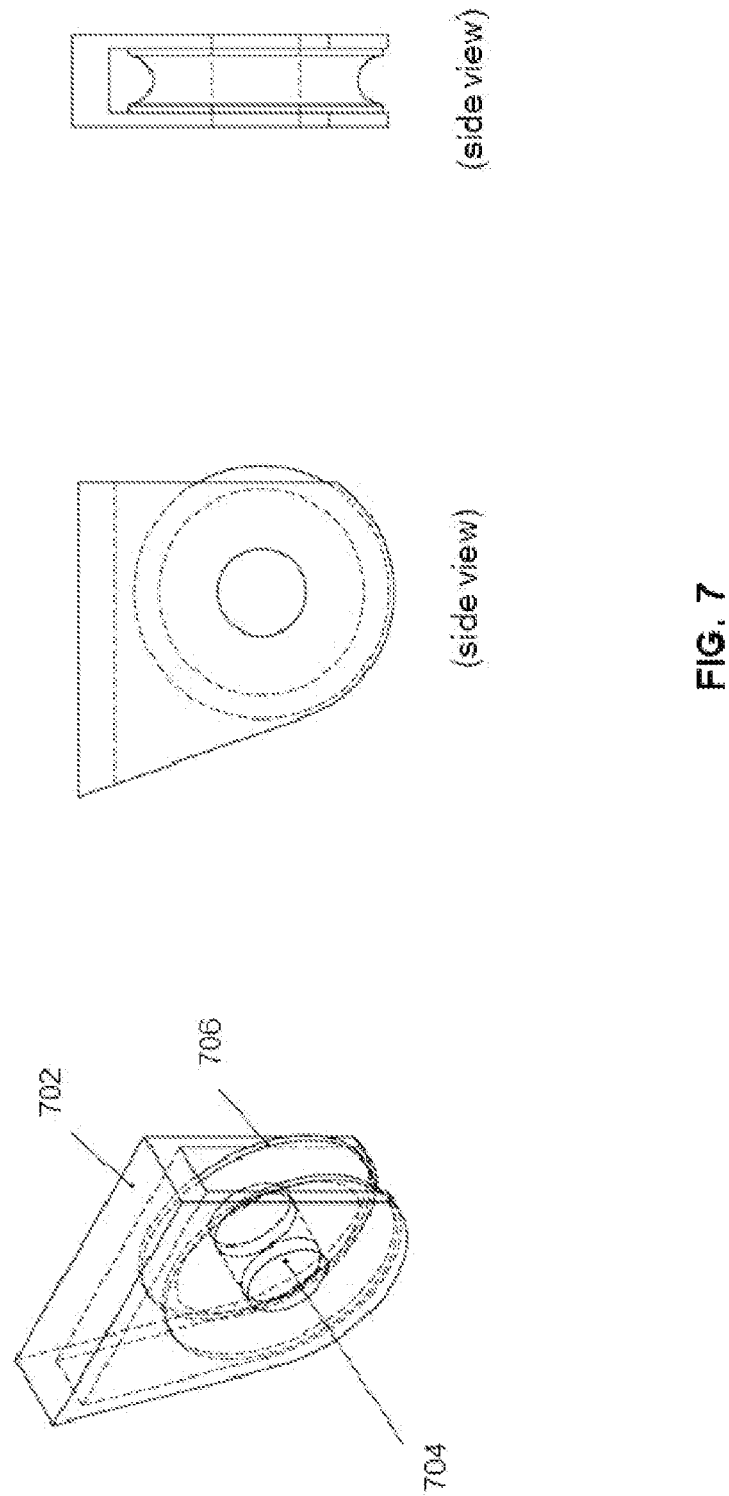
FIG. 7 illustrates a wheel support assembly according to some embodiments.

Referring now to FIG. 7, a wheel support assembly according to some embodiments is provided. In this example, the assembly includes clevis 702, clevis pin 704, and a grooved wheel 706. FIG. 7 also shows side views of the assembly.

Figure 8:
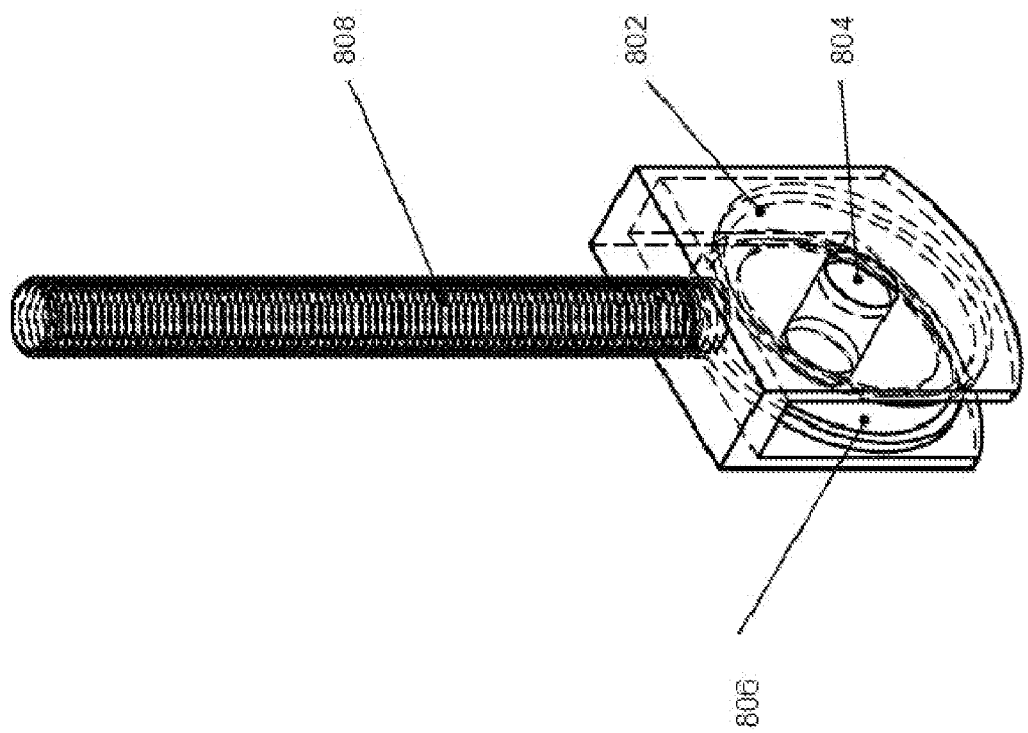
FIG. 8 illustrates a tensioner assembly according to some embodiments.

Referring now to FIG. 8, a tensioner assembly is provided according to some embodiments. In this example, the assembly includes tensioner clevis 802, tensioner pin 804, grooved wheel 806, and threaded bar 808. In some embodiments, threaded bar 808 is threaded through clevis and butt welded. With respect to FIGS. 7 and 8, in some cases, the ends of the rope can be terminated in loop splices. The rope may be, for instance, threaded around a capstan such that the inner tank is constrained. The loop splices as the end of the ropes can be installed using wheel 806. This can be used to tension the ropes after assembly.

Referring now to FIG. 9, FIG. 9 illustrates two views of a vessel 900 with rope (e.g., a synthetic rope such as Kevlar®) and Belleville washers according to some embodiments. As some materials may be stiff (e.g., Kevlar®) and not stretch before failure, embodiments provide for some compliance in case of mechanical shock. For instance, a threaded tensioning arrangement can be used to tighten the rope, and also Belleville washers may be selected to provide the appropriate amount of tension. Vessel 900 may incorporate one or more of the assemblies set forth in FIGS. 7 and 8. Although Kevlar® is used in this example, according to embodiments, other suitable materials could be used.

According to some embodiments, when arranged for operation at 3 bar, the thickness of the sidewall of an inner storage vessel can be below 10 mm, for example, 8 mm. This would be in contrast, for instance, with a 20 mm thickness. This can enable, in some cases, easier welding and a reduction in the weight and cost. Additionally, for every 1 mm thickness reduction the internal volume, for example for a 300 liter tank, increases by 1 liter per millimeter so the volume increases by 12 liters, in this example.

According to some embodiments, ullage improvements are provided. Ullage may refer, for instance, to the dead space that cannot be utilized within the tank to allow expansion room for the liquid to expand into to prevent a catastrophic failure caused by the hydraulic pressure from the liquid expanding as it warms. Where there may be a 10% requirement for a 15 bar high pressure tank ullage, for a 3 bar 300 liter tank according to embodiments, this drops to less than a 4% ullage set aside as dead space. Taken together, in this example, the increase in volume for a 300 liter square tank going from 15 bar (200 mm wall thickness) to 3 bar (8 mm wall thickness) would be 12 liters plus 1.06 time 312=330 or an extra 10% physical volume space. Taking into account the fact that the methane is 30% denser, this could lead to an additional effective energy content improvement of 13%, in this example. Moreover, there would also be a 56% reduction in weight and raw material cost.

According to some embodiments, by using a compressor to fulfil a gas feed requirement for an engine, there may be little need to build up any significant pressure within the tank. This could be, for instance, in the arrangement set forth in FIGS. 3 and 4. In some instances, a small amount of positive pressure, for example 100 mbar, could be desirable to prevent ingress of air into the methane tank which would present a safety hazard. According to embodiments, the need for any ullage space can be avoided, making available the additional space for more liquid. Thus, according to some embodiments, a liquid methane storage tank is provided that does not need any ullage space. In certain aspects, the tank may operate at a pressure of 100 mbar or below, including down to 0 bar.

According to some embodiments, a storage tank may be implemented on a vehicle. As used herein, the term vehicle includes, but is not limited to, ground-based vehicles (such as cars, trucks, motorcycles, and tractors), sea-based vehicles (such as boats), and air-based vehicles (such as airplanes or drones).

Although some examples are described with respect to Kevlar®, other fibrous materials, including synthetic fibers such as other para-aramid synthetic fibers can be used. For instance, other materials that maintain strength and resilience over a broad temperature range, including down to cryogenic temperatures may be used. According to some embodiments, the rope material used for the suspension system of the inner tank should have the specific properties of high strength, and very low thermal conductivity and low elasticity over many years. For some vehicle applications, the UN R110 regulations require that the tank must be able to withstand an impact deceleration or acceleration of 9G in any axis. The testing process also includes a 9 meter drop without liquid release for 60 minutes, which can result in even higher forces in order for the suspension system to survive and yet not allow a rapid heat ingress. Therefore, in certain embodiments, the material is not only able to support the tank's mass, but orders of magnitude more. In addition, the integrity of the vacuum insulation must be maintained to avoid heat ingress and so the material has low outgassing properties in some embodiments.

The UN R110 regulations also includes a bonfire test which must reach a temperature of 650 C for 60 minutes with a controlled release of gas resulting so failing in a controlled way could be important for the venting process. In some embodiments, as the system fails, heat is only allowed into the tank slowly to allow the pressure relief valve to handle the increased gas boil-off in this instance. Therefore, in this example, the temperature range of the fiber used should also be able to withstand high temperatures for as long as possible.

Referring now to FIG. 14, a process 1400 for assembling a storage system and/or fuel delivery system is provided according to some embodiments. In step 1402, an inner storage vessel is placed within an outer storage vessel. The inner vessel may be adapted to store liquid methane. In step 1404, the inner storage vessel is attached to the outer storage vessel using a support system. According to some embodiments, the support system comprises a synthetic rope suspension system, and at least one of the inner and outer vessels has a square or rounded rectangular cross-section. The process 1400 may be used, for instance, in connection with any of the systems and devices illustrated with respect to FIGS. 3-13.

Figure 15A:
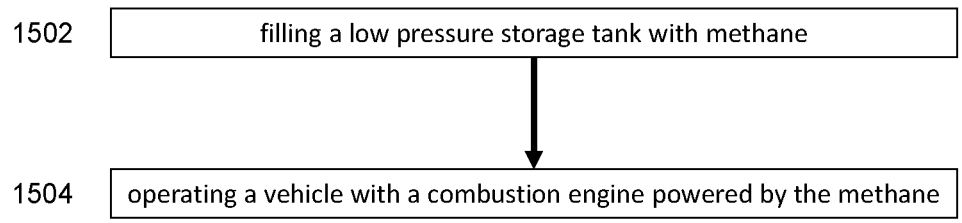
FIGS. 15A and 15B illustrate processes according to some embodiments.

Referring now to FIG. 15A, a process 1500 for operating a vehicle is provided according to some embodiments. In step 1502, a storage tank is filled with methane. This could be, for instance, any tank illustrated with respect to FIGS. 3-13. In step 1504, the vehicle is operated using a combustion engine powered by the methane. The vehicle can be, for example, a truck or tractor.

Figure 15B:
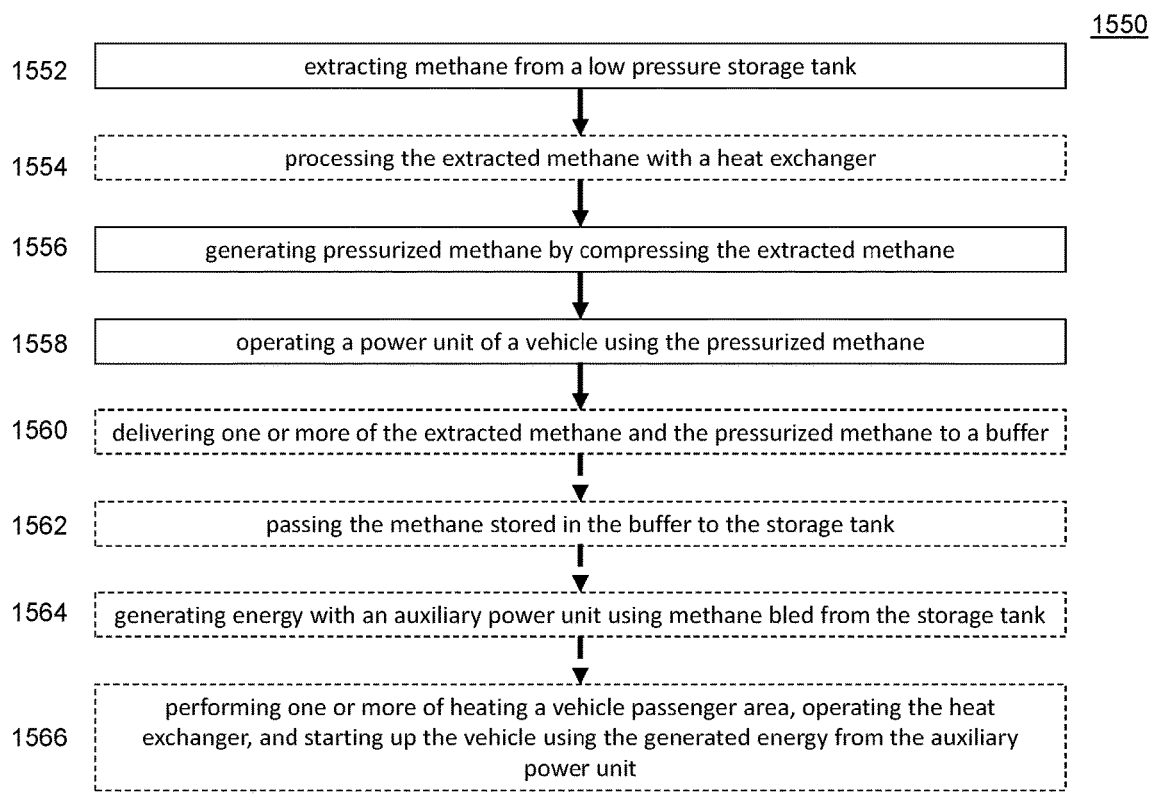

Referring now to FIG. 15B, a process 1550 for operating a vehicle is provided according to some embodiments. In step 1552, methane is extracted from a low pressure storage tank. This could be, for instance, any tank illustrated with respect to FIGS. 3-13. For example, the tank may comprise one or more of a rope suspension system and a storage vessel having a square or rounded rectangular shape in cross-section.

In step 1554, which may be optional according to some embodiments, the extracted methane can be processed with a heat exchanger, such as heat exchanger 306. This could include, for example, vaporization. In step 1556, pressurized methane is generated by compressing methane, such as the extracted or processed methane (e.g., using one or more of compressors 310 and 311), and in step 1558, a power unit of the vehicle is operated using the pressurized methane.

According to embodiments, the method may further comprise delivering (step 1560) one or more of the extracted methane and the pressurized methane to a buffer, and passing (step 1562) the methane stored in the buffer back into the storage tank. In some embodiments, the delivering comprises use of a pressure booster and second compressor, for instance, as illustrated with respect to FIG. 3. In some embodiments, the method 1550 also includes generating energy (step 1564), such as electrical energy, with an auxiliary power unit (e.g., unit 308) using methane bled from said storage tank, such as one or more of the methane stored in the buffer and the methane processed by said heat exchanger. The method may also include performing (step 1566) one or more of heating a vehicle passenger area, operating the heat exchanger, and starting up the vehicle using said generated energy from the auxiliary power unit. Additionally, any of the extracting (step 1552), processing (step 1554), generating pressurized methane (step 1556), delivering (step 1560), passing (step 1562), generating energy (step 1564), and performing the operations of step 1566 can be in response to a demand for gaseous methane.

According to some embodiments, an ultrasonic level sensor is used in connection with one or more of systems described above. For example, in order to provide an output for the amount of liquid methane left in the tank an ultrasonic transducer is fixed to the underside of the inner liquid methane tank. This could be, for instance, a tank as shown in FIG. 3 or 4. In some embodiments, the sensor sends an ultrasonic signal through the inner tank wall and through the liquid methane until it hits the top surface of the liquid methane. This signal is then reflected back to the transducer and the time take for the round trip used to calculate the height of the liquid methane in the tank and from this the total quantity of fuel then calculated. In order to manage the condition of the liquid methane, additional sensors can be incorporated. The temperature of the liquid methane can also be measured by a thermocouple fixed to the outside of the inner tank. Also a pressure sensor is positioned in the output line of the tank.

According to some embodiments, the use of the readings taken from these sensors is used by a micro-processor to control the opening of closing of valves positioned in the gas panel and compressors to ensure that the liquid methane storage condition is actively managed. In addition, data relating to the tank's state is sent via the Internet or other network to a central control facility so that if there is any issue relating to the state of the liquid methane's safe storage the necessary steps can be taken.

According to some embodiments, communication and processing can be accomplished using a control module 1600. FIG. 16 is a block diagram of such a control unit, according to some embodiments. As shown in FIG. 16, the control unit may comprise: a data processing system (DPS) 1602, which may include one or more processors 1655 (e.g., a general purpose microprocessor and/or one or more other processors, such as an application specific integrated circuit (ASIC), field-programmable gate arrays (FPGAs), and the like); a radio transmitter 1605 and a radio receiver 1606 coupled to an antenna 1622 for use in wirelessly communicating with a control facility or other service; and local storage unit (a.k.a., "data storage system") 1608, which may include one or more non-volatile storage devices and/or one or more volatile storage devices (e.g., random access memory (RANI)). In embodiments where the control unit includes a general purpose microprocessor, a computer program product (CPP) 1641 may be provided. CPP 1641 includes a computer readable medium (CRM) 1642 storing a computer program (CP) 1643 comprising computer readable instructions (CRI) 1644. CRM 1642 may be a non-transitory computer readable medium, such as, but not limited to, magnetic media (e.g., a hard disk), optical media (e.g., a DVD), memory devices (e.g., random access memory), and the like. In some embodiments, the CRI 1644 of computer program 1643 is configured such that when executed by data processing system 1602, the CRI causes the control unit to perform steps described above (e.g., steps described above with reference to the flow charts). In other embodiments, the control unit may be configured to perform steps described herein without the need for code. That is, for example, data processing system 1602 may consist merely of one or more ASICs. Hence, the features of embodiments described herein may be implemented in hardware and/or software.

Although methane is used as an example, the storage elements described herein can be used for storage, including cryogenic storage, of other materials as well. For instance, hydrogen fuels may be used, and other materials (e.g., oxygen, helium, argon, and nitrogen) may be stored according to the embodiments described herein. Similarly, fuel storage and delivery systems according to embodiments also apply to non-methane fuels.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of assembling a methane storage tank, comprising
    placing an inner storage vessel within an outer vessel, wherein the inner storage vessel is adapted to store liquid methane; and
    attaching the inner storage vessel to the outer storage vessel using a support system, wherein the inner storage vessel comprises a first flat surface and a second flat surface, and wherein the first and second flat surfaces are arranged orthogonally to each other, wherein the support system comprises a rope suspension system and the attaching comprises tensioning the rope suspensions system using a first connection element on the first flat surface and a second connection element on the second flat surface.

2. The method of claim 1, wherein the support system comprises tensioned rope made from aramid or para-aramid synthetic fibers.

3. The method of claim 1, wherein the rope suspension system is tensioned with a threaded arrangement of the storage tank.

4. The method of claim 1, wherein attaching the inner storage vessel to the outer storage vessel comprises tensioning a rope of the rope suspension system about a plurality of connection elements on at least one of the first and second flat surfaces.

5. A methane storage tank, comprising:
    an outer vessel;
    an inner storage vessel arranged within the outer vessel and adapted to store liquid methane;
    a rope support system connecting the inner storage vessel to the outer vessel, wherein both the outer vessel and inner storage vessel have a non-cylindrical shape, and wherein the inner storage vessel comprises a first flat surface and a second flat surface, and wherein the first and second flat surfaces are arranged orthogonally to each other; and
    a first connection element mounted on the first flat surface and a second connection element mounted on the second flat surface.

6. The storage tank of claim 5, wherein a cross-section of the inner storage vessel is a square or a rounded rectangle.

7. The storage tank of claim 5, wherein the inner storage vessel has an L-shape.

8. The methane storage tank of claim 5, wherein the first and second flat surfaces are adjoining surfaces that form a corner of the inner storage vessel.

9. The methane storage tank of claim 5, wherein the tank further comprises a thermocouple fixedly attached to an outer surface of the inner storage vessel,
    or the tank further comprises an output line, wherein the output line has a pressure sensor,
    or wherein at least one of the inner and outer vessels comprises an ultrasonic transducer configured to provide data regarding a level of the methane in the inner storage vessel based an ultrasonic signal transmitted through the inner storage vessel.

10. The methane storage tank of claim 5, wherein the support system comprises tensioned rope made from aramid or para aramid synthetic fibers.

11. The methane storage tank of claim 5, wherein the inner storage vessel is arranged within the outer vessel without a metal supporting collar, the support system is arranged to prevent the inner storage vessel from directly contacting the outer vessel, and a space between the inner and outer vessel is vacuum.

12. The methane storage tank of claim 5, wherein the storage tank is mounted in a vehicle and connected to a combustion engine, wherein the tank is further arranged to deliver the methane to the combustion engine.

13. A storage tank, comprising:
    an outer vessel;
    an inner storage vessel arranged within the outer vessel; and
    a support system connecting the inner storage vessel to the outer vessel,
    wherein the support system comprises a tensioned rope suspension system connecting a first connection element mounted on the outer vessel with a second connection element mounted on the inner storage vessel,
    wherein the outer vessel comprises first and second distal ends along a longitudinal direction of the outer vessel, and wherein a rope of the tensioned rope suspension system extends from the first distal end to the second distal end along the longitudinal direction of the outer vessel.

14. The storage tank of claim 13, wherein the inner storage vessel comprises third and fourth distal ends along a longitudinal direction of the inner storage vessel, and wherein the rope of the tensioned rope suspension system connects the first distal end of the outer vessel to the third distal end of the inner storage vessel and connects the second distal end of the outer vessel to the fourth distal end of the inner storage vessel.

15. A storage tank, comprising:
    an outer vessel;
    an inner storage vessel arranged within the outer vessel, wherein both the outer vessel and inner storage vessel have a non-cylindrical shape comprising a plurality of orthogonal flat surfaces;

a support system connecting the inner storage vessel to the outer vessel; and a first plurality of connection elements on a first flat surface of the inner storage vessel and a second plurality of connection elements on a second flat surface of the inner storage vessel, wherein the first and second flat surfaces of the inner storage vessel are orthogonal, wherein the support system comprises a tensioned rope suspension system connecting at least one connection element mounted on the outer vessel with at least one of the connection elements of the inner storage vessel, wherein the tensioned rope suspension system is connected to the at least one connection element with a loop formed from a splice of the rope.

16. A storage tank, comprising:

an outer vessel;

an inner storage vessel arranged within the outer vessel; and a support system connecting the inner storage vessel to the outer vessel, wherein the support system comprises a tensioned rope suspension system connecting a first connection element mounted on the outer vessel with a second connection element mounted on the inner storage vessel, and connecting a third connection element mounted on the outer vessel with a fourth connection element mounted on the inner storage vessel, wherein the inner vessel comprises a first flat surface and a second flat surface, wherein the first and second flat surfaces are arranged orthogonally to each other, wherein the second connection element is arranged on the first flat surface and the fourth connection element is arranged on the second flat surface, and wherein at least one of the first connection element and the second connection element comprises at least one rounded peg, capstan, or Belleville washer, wherein the rope suspension system is threaded about the at least one rounded peg, capstan, or Belleville washer.

17. The storage tank of claim 16, wherein the first and second flat surfaces are adjoining surfaces that form a corner of the inner storage vessel.

18. The storage tank of claim 17, wherein the inner vessel is constrained in the vertical, lateral, and longitudinal directions, and wherein the inner vessel is constrained to prevent movement about a rotational axis.

19. The storage tank of claim 16, wherein the support system comprises tensioned rope made from aramid or para aramid fibers.

20. The storage tank of claim 16, wherein the outer vessel comprises first and second distal ends along a longitudinal direction of the outer vessel, and wherein a rope of the tensioned rope suspension system extends from the first distal end to the second distal end along the longitudinal direction of the outer vessel.

21. The storage tank of claim 20, wherein the inner storage vessel comprises third and fourth distal ends along a longitudinal direction of the inner storage vessel, and wherein the rope of the tensioned rope suspension system connects the first distal end of the outer vessel to the third distal end of the inner storage vessel and connects the second distal end of the outer vessel to the fourth distal end of the inner storage vessel.

22. The storage tank of claim 16, wherein the tensioned rope suspension system is connected to the first or second connection element with a loop, and wherein the loop is formed from a splice of the rope.

23. The storage tank of claim 16, wherein the inner storage vessel comprises at least four flat surfaces, and wherein each of the at least four flat surfaces comprise two or more connection elements arranged thereon.

24. The storage tank of claim 23, wherein the second and fourth connection elements of the inner storage vessel are both directly connected to a connection element on a corresponding surface of the outer vessel.

25. The storage tank of claim 16, further comprising a tensioner assembly.

26. The storage tank of claim 25, wherein the tensioner assembly comprises a threaded bar.

* * * * *